July 28, 1925.

E. P. HUMMEL

TRAY FOR INCUBATORS

Filed Oct. 17, 1924

1,547,920

2 Sheets-Sheet 1

E. P. Hummel, INVENTOR

BY Victor J. Evans, ATTORNEY

July 28, 1925.  
E. P. HUMMEL  
TRAY FOR INCUBATORS  
Filed Oct. 17, 1924  
1,547,920  
2 Sheets-Sheet 2
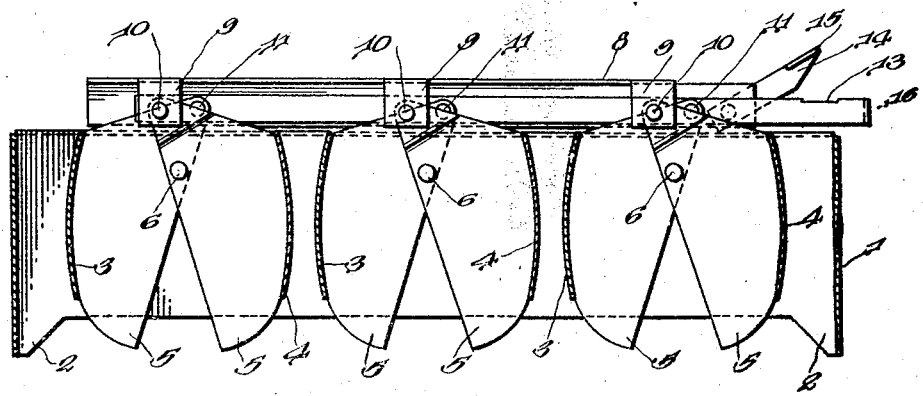
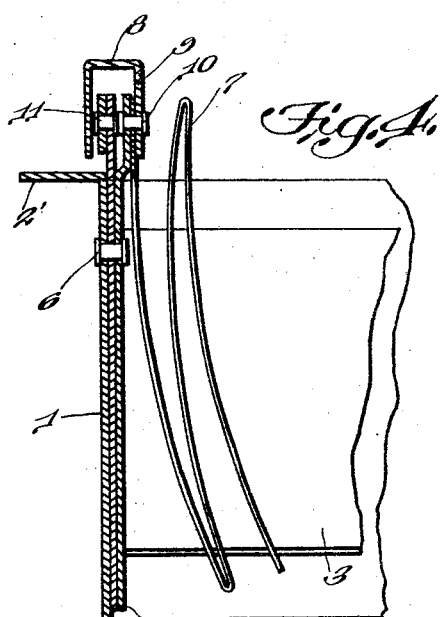
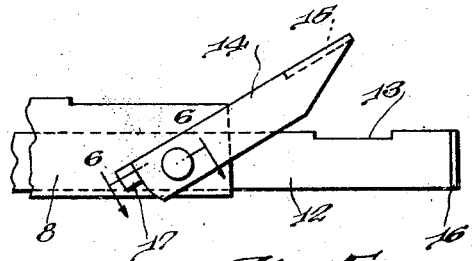
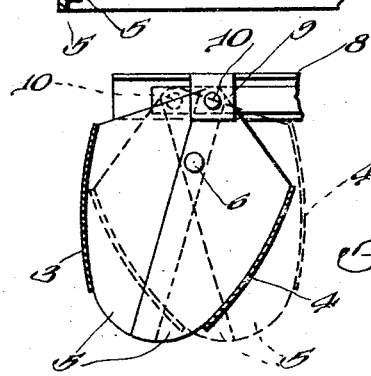
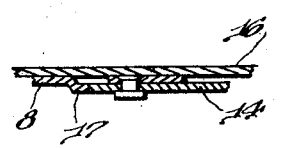
E. P. Hummel, INVENTOR
BY Victor J. Evans, ATTORNEY Patented July 28, 1925.

1,547,920

UNITED STATES PATENT OFFICE.

EDWARD P. HUMMEL, OF STERLING, COLORADO.

TRAY FOR INCUBATORS.

Application filed October 17, 1924. Serial No. 744,209.

*To all whom it may concern:*

Be it known that I, EDWARD P. HUMMEL, a citizen of the United States, residing at Sterling, in the county of Logan and State of Colorado, have invented new and useful Improvements in Trays for Incubators, of which the following is a specification.

This invention relates to new and useful improvements in egg trays and more particularly to an egg tray which is especially adapted for use in incubators. The main object of my invention is the provision of an egg tray whereby the eggs may be supported in the most desirable position during incubation and may be quickly and readily transferred to the hatching tray at the proper time previous to hatching.

Another object of my invention is the provision of an egg tray for incubators wherein the eggs are supported in such a position as to permit them to be readily candled during incubation at proper intervals so that the infertile eggs may be removed.

A further object of my invention is the provision of an egg tray for incubators wherein the supporting elements for the eggs are pivotally mounted and means is provided whereby the egg supports may be quickly and readily moved to various positions either for candling or for any other similar purpose.

Figure 1:
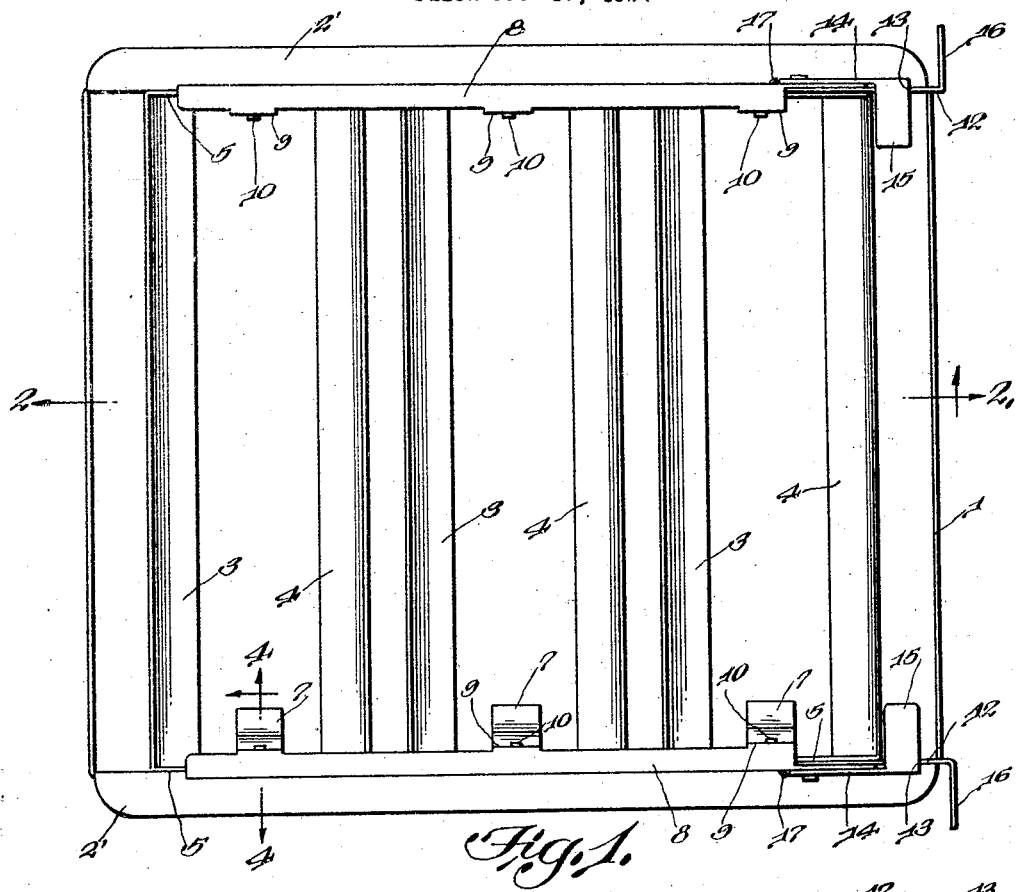
Figure 2:
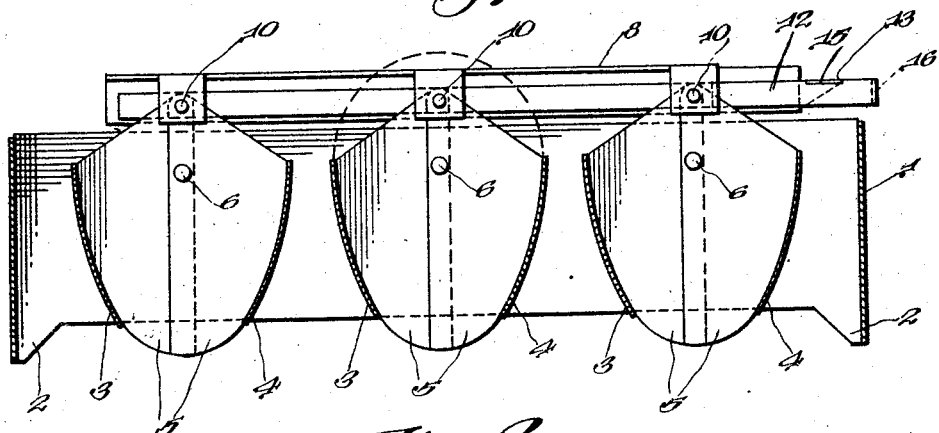

With the above and other objects in view, the invention consists in the novel features of construction, the combination and arrangement of parts hereinafter more fully set forth, pointed out in the claims and shown in the accompanying drawings, in which:

Fig. 1 is a plan view of an egg tray constructed in accordance with my invention, Fig. 2 is a transverse section on the line 2—2 of Fig. 1 showing the tray members in a closed position, Fig. 3 is a similar view illustrating the trays in an open position whereby the eggs may be deposited upon the hatching trays, Fig. 4 is a detail section on the line 4—4 of Fig. 1, Fig. 5 is a detail side elevation of the locking lever, Fig. 6 is a detail section on the line 6—6 of Fig. 5, and Fig. 7 is a detail section thru one of the supporting members illustrating the same tilted to two different positions.

In carrying out my invention I provide a substantially rectangular body frame 1 and supporting legs 2 at each corner thereof whereby to support the frame in spaced relation with a table when the tray is placed thereon to prevent the ends of the eggs from striking the table. The trays are supported in the incubator to provide for the proper space between the same to accommodate eggs of various sizes.

The upper edges of either portions of the tray are provided with outstanding flanges 2' as clearly illustrated in Fig. 1. A plurality of egg supporting members are extended transversely of the frame 1 and mounted for pivoted movement. Each of these egg supporting members comprises two opposed curved side portions 3 and 4 having inturned end flanges 5 which overlap at their meeting edges and are pivotally connected as at 6, the pivot which connects these flanges being carried by the walls of the frame. When the opposed members 3 and 4 are in their normal egg supporting position, the edges of the flanges 5 in each of the members 3 and 4 are in overlapping parallel relation as shown in Fig. 2 so that the lower edges of the side members 3 and 4 are arranged in predetermined spaced relation to form a trough in which the eggs are placed for supporting them in proper position. In constructing the side members 3 and 4 the curvature of these members is to be such as to readily conform to the curvature of an egg so that the eggs when placed in the troughs will lie in a suitable position as shown by the dotted lines in Fig. 2. This position of the eggs in the troughs will permit a candling light to be placed beneath the eggs when it is desired to candle them and remove the infertile eggs from the tray.

In order to retain the eggs in close nesting position in respect to each other, after being placed in the troughs within the tray, a support member 7 is arranged in one end of each of the troughs so that after the last egg has been placed in position in the trough the spring can be contracted to permit the eggs to be readily removed and when released will engage the egg which has been inserted last and thru its frictional contact therewith retain all the eggs in their proper positions in the troughs.

In order that the side members 3 and 4 of each of the troughs may be swung to an open position to permit the eggs in the troughs to be deposited upon the hatching tray suitable means is provided for moving these members to an open position as shown in Fig. 3. This means includes an angular bar 8 provided with tongues 9 which extend parallel with the main body of the bar and carry pivot pins 10 which connect to the uppermost corners of the side members 4. The uppermost members of the side members 3 are connected to the pivot pins 11 carried by the movable bar 12. In order to lock these two bars together for simultaneous movement to tilt the troughs to various positions as shown in Fig. 7, the bar 12 is provided with a recess 13 in its upper edge adjacent its outer end and pivotally connected to the outer end of the bar 18 is a lever member 14 having a transverse tongue 15 at its outer end to engage within the recess 13, thus when the tongue 15 is disposed in the recess 13 the two bars are locked together for simultaneous movement.

The outer end of each of the bars 12 is provided with angular end portions 16 forming finger grips for reciprocating both of the bars when locked together or reciprocating the bar 12 when the bar 8 is disconnected therefrom. When it is desired to move the side members 3 and 4 of the troughs apart to permit the eggs to drop from the troughs into the hatching tray, the lever 14 is disconnected from the bar 12 and by pushing inwardly upon the finger 15 and pulling outwardly thru the connection with the angular portion 16, the bars 8 and 12 will be reciprocated in opposite directions to swing the two members 3 and 4 apart as shown in Fig. 3.

The bars 8 are provided upon their outer faces with vertical stop plugs 17 which are adapted to be engaged by the inner end of the lever 14 during its swinging movement to an open position, in order to limit the swinging movement of this lever so that when moved to an unlocked position it will readily assume a position whereby the operator may readily push the lever and reciprocate the bar 8.

It will be apparent from the foregoing that I have provided a simple and inexpensive egg tray for incubators whereby the eggs may be quickly and readily placed in position in suitable supporting troughs and be retained in a suitable position so that they can be readily candled for removing the infertile eggs. It will also be apparent that prior to the hatching of the eggs, they may be quickly and readily removed from the tray and disposed upon the hatching tray. It will also be noted that by providing the spring 7 in each of the troughs, the eggs when in their normal position for incubation will be securely nested against each other and thus eliminate any packing between the eggs to retain them in their proper positions.

While I have shown and described the preferred embodiment of my invention, it will be understood that various changes and alterations may be made without departing from the spirit of the invention and the scope of the appended claims.

Having thus described my invention, what I claim is:

1. An egg tray including a frame, troughs extending transversely of the frame comprising pivotally mounted opposed side members, means for moving said side members toward and away from each other upon their pivots and means whereby to impart movement to said side members simultaneously.

2. An egg tray including a frame, egg supporting troughs in said frame including opposed curved side members pivotally connected to the frame, means pivotally connected to each of said side members whereby to move them toward and away from each other and additional means whereby to rock said members upon their pivots simultaneously.

3. An egg tray including egg supporting troughs comprising curved side members, inwardly extending overlapping flanges upon the ends of the side members, means pivotally connecting said flanges to the frame, means pivotally connected to the flanges for rocking them upon their pivots whereby to move the side members toward and away from each other and additional means pivotally connected to the flanges whereby to rock the flanges upon their pivots simultaneously in the same general direction.

4. An egg tray including egg supporting troughs comprising movable side members pivotally connected to the tray, parallel bars arranged at each end of the troughs, means pivotally connecting one of the bars to one of the side members, means pivotally connecting the other bar to the other side member, means for locking said bars together for simultaneous movement whereby to rock said troughs upon their pivots and means whereby the side members are moved in opposite directions when the locking means is released and the bars reciprocated in opposite directions.

In testimony whereof I affix my signature.

EDWARD P. HUMMEL.